A. JAMISON.
Harvesters.
No. 153,258. Patented July 21, 1874.
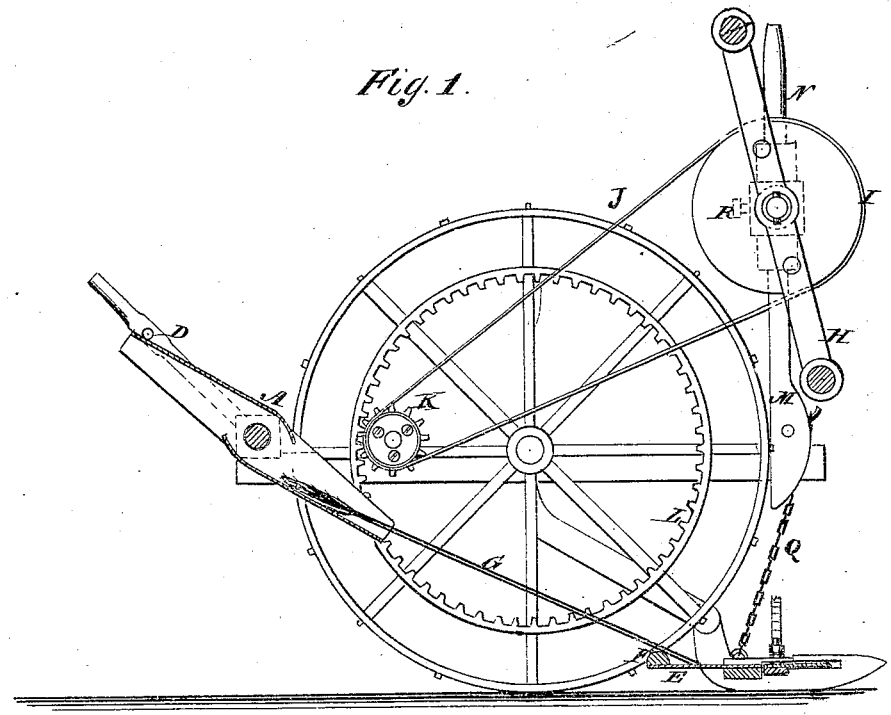
Fig. 1.
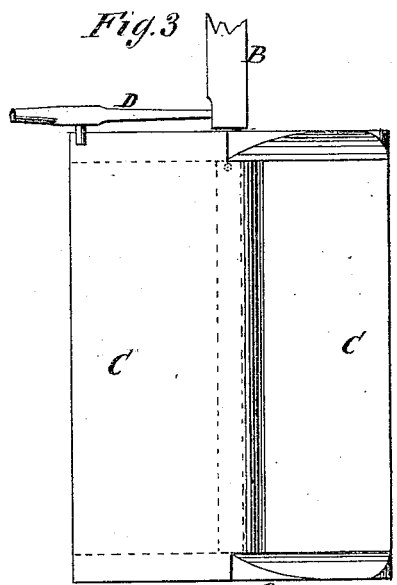
Fig. 3.
Fig. 2.
Witnesses:
E. Wolff
Sedgwick
Inventor:
A. Jamison
per
Attorneys.

UNITED STATES PATENT OFFICE.

ANDREW JAMISON, OF TAYLORSTOWN, PENNSYLVANIA.

IMPROVEMENT IN HARVESTERS.

Specification forming part of Letters Patent No. 153,258, dated July 21, 1874; application filed December 31, 1872.

*To all whom it may concern:*

Be it known that I, ANDREW JAMISON, of Taylorstown, in the county of Washington and State of Pennsylvania, have invented an Improvement in Mowing-Machines; and I do hereby declare that the following is a full, clear, and exact description of the same, reference being had to the accompanying drawing, forming a part of this specification.

The invention relates to the arrangement of the reel on the lever which tilts or raises the finger-bar, as hereinafter specified.

In the accompanying drawing, Figure 1 represents a vertical section of a reaper embracing my improvements. Fig. 2 represents the reel in section, showing the socket-handle and mower-lever. Fig. 3 is a side view of the rotary dropper detached.

Similar letters of reference indicate corresponding parts.

A is a rotary dropper, mounted on a shaft, B, and having wings C C. The spring arm or catch D serves to hold it in an inclined position when the heads of the grain rest against or on it, as shown in Fig. 1. A plate, E, having a rib, F, at its rear edge, is attached to the finger-bar, and projects rearwardly, as shown. This plate serves to support the severed butts of the grain G until the dropper is allowed to revolve. N is a socket, which fits on the upper end of the lever M, that serves to adjust the finger-bar at various heights.

The reel H and band-pulley I, rigidly connected, are mounted and revolve on the short shaft P, which is a lateral extension of a ring, O, fitting over the socket-piece N, and adapted to be vertically adjusted thereon by means of a clamp-screw, R. Motion is imparted to the reel by belt J on reel-pulley I and the pulley-pinion K of the driving-shaft.

It is evident that the belt J will be kept taut by the weight of the finger-bar and its appendages acting on the lever M through the medium of the chain Q.

When the machine is employed as a reaper, the finger-bar will naturally be adjusted higher than a mower. Any change from one height or position to another may be readily effected by shortening or lengthening the chain Q and adjusting the ring O on the socket N.

I am thus enabled to convert a mower into a harvester, and vice versa, with little difficulty, and by aid of a detachable apparatus simple in construction and inexpensive.

Having thus described my invention, I claim as new and desire to secure by Letters Patent—

The reel H, mounted on the pivoted lever M, which tilts or raises the finger-bar, substantially as shown and described.

ANDREW JAMISON.

Witnesses:
  A. E. McCLEES,
  A. D. McCARRELL.